Sept. 19, 1939.　　　　P. F. HATCH　　　　2,173,321

WHEEL BALANCING UNIT

Filed Aug. 3, 1936

Paul F. Hatch
Inventor

By Beaman + Langford
Attorney

Patented Sept. 19, 1939

2,173,321

UNITED STATES PATENT OFFICE 2,173,321

WHEEL BALANCING UNIT

Paul F. Hatch, Ypsilanti, Mich., assignor to Harley C. Loney Company, Detroit, Mich., a corporation of Michigan Application August 3, 1936, Serial No. 93,934

2 Claims. (Cl. 301—5)

This invention relates to balancing weights for attachment to the tire retaining flange of a vehicle wheel to balance the unbalanced force which would otherwise result in objectionable vibration of the wheel on rotation. This invention constitutes an embodiment of that disclosed in the patent to James W. Hume, No. 2,036,757, as particularly adapted to be used on wheel rims of the type generally used for oversized low pressure tires although of course it may be applied to any rim.

In balance units of the type wherein the weight is secured by a spring clip which resiliently holds the weight against the underside of the rim flange, great difficulty is encountered in removing the balancing weight after it has been secured in balancing position.

An object of the invention is therefore to provide a balancing weight for attachment to a tire rim flange by means of a spring clip wherein the unit is provided with means to insert a tool to facilitate the removal of the weight from the rim flange.

Another object is to provide the means set forth above in the form of a hole in the spring clip for receiving a pin by means of which the weight may be rotated from the rim flange.

Figure 1:
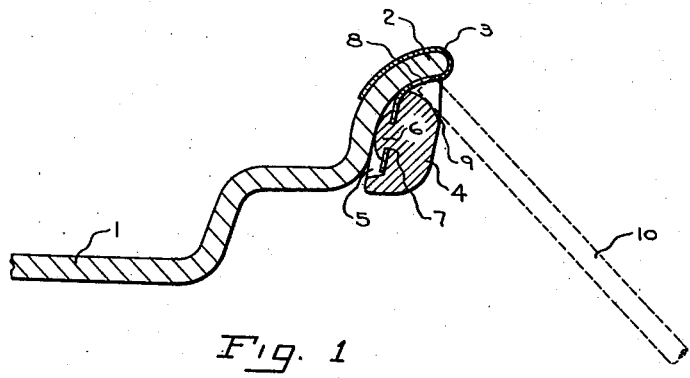
Figure 2:
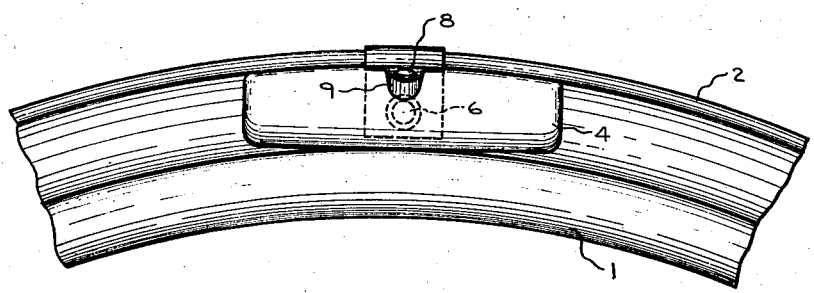
Figure 3:
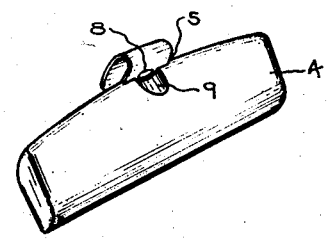

These and other objects will be apparent from the following specification when taken with the accompanying drawing in which, Fig. 1 is a radial section of a rim with the balancing weight secured thereto, Fig. 2 is a side elevation showing a portion of the rim with the weight secured thereto, and Fig. 3 is a perspective view of the weight alone.

Referring to the drawing reference character 1 indicates a usual tire supporting rim having a flange 2. Secured by spring clip 3 to the flange 2 is a cast weight 4. The face of the weight 4 adjacent the flange 2 is provided with a curvature corresponding to the underside of the flange 2 so that when held there against the spring clip 3 a snug fit is provided.

The flange side of the weight 4 is provided with a recess 5 in which is secured by a rivet 6 the spring clip 3. The rivet 6 is formed integrally with the weight 4. The rivet 6 passes through a hole 7 in the spring clip 3, the rivet 6 being headed up over the hole to make a secure connection.

The rim engaging portion of the spring clip 3 is roughly U-shaped in configuration but curved to conform to the shape of the flange 2. When separated from flange 2 the legs of the rim engaging portion and the spring clip 3 are slightly closer together than the thickness of the flange 2 so that when the weight 4 is secured to the flange 2 a firm connection is obtained.

Prior balancing weights secured to rim flanges by spring clips have had the spring clip secured to the weight on the outside of the weight so that in effect the weight is clamped to the rim between the legs of the spring. Such a construction is disclosed in the application of James W. Hume, Serial No. 45,172, filed October 16, 1935, now Patent No. 2,122,065. In the present construction the spring clip is secured to the inside or flange side of the weight 4 for the purpose of providing a more attractive construction. One method of removing from the wheel rim the weights as disclosed in the aforesaid application was to provide a hole in the weight for receiving a rod by means of which the weight could be rotated from the flange. Were such a construction applied to the present weight wherein the spring clip is secured to the inside of the weight 4, the rotating force to remove the weight 4 from the rim 2 would result in tending to draw the weight 4 away from the spring clip 3 and thus permanently deform the spring clip 3. In order to overcome this objection the force for removing the balancing assembly from the rim 2 is applied directly to the spring clip 3.

The particular construction employed comprises a hole 8 on the side of the spring clip 3 adjacent the underside of the rim 2. In order that there be a free passage past the weight 4 to the hole 8 a recess 9 in the weight 4 opposite the hole 8 is provided. A rod 10, as shown in dotted outline in Fig. 1, is inserted in the hole 8. Downward pressure on the rod 10 then results in its fulcruming about the lower surface of the recess 9 of the weight 4 to rotate the spring clip 2 together with the weight 4 from the flange 2. It will be clear that the spring clip 3 and weight 4 may be assembled on the flange 2 by manual force.

The portion of the spring clip 3 which extends over the upper or inside of the flange 2 is preferably of a length to extend inwardly a sufficient distance to be clamped between the side wall of a tire and the rim flange when the tire is inflated whereby the weight is at least partially held in position by the tire. It has been found to be satisfactory to construct the weights of bronze, the spring clips of steel and the rod of sufficiently heavy wire. However, other suitable materials may be used for the parts.

Having thus described my invention what I desire to claim and secure by Letters Patent is:

1. A balance weight for vehicle wheels adapted to embrace the flange of the tire rim to be disposed upon the outside thereof, comprising a thickened body, a spring metal clip having one end attached to said body, a portion of said clip removed from its point of attachment to said body being of return bent construction so as to be disposed upon opposite sides of the rim flange, and having the bight portion thereof embracing the edge of the rim flange, an aperture defined in the wall of said clip directly adjacent said bight portion, and a shoulder portion upon said body opposite said aperture upon which a tool may be freely supported for insertion into said aperture, whereby said balance weight may be rocked about said rim and off of said rim flange.

2. A balance weight for vehicle wheels adapted to embrace the flange of the tire rim to be disposed upon the outside thereof, comprising a thickened body, a spring metal clip disposed along the rim side of said body and having one end attached to a central portion of said body, a portion of said clip removed from its point of attachment with said body being of return bent construction so as to be disposed upon opposite sides of the rim flange and having the bight portion thereof embracing the edge of said rim flange, an aperture defined in the wall of said clip directly adjacent said bight portion, a recess defined along the top of said body opposite said aperture upon which a tool may be freely supported for insertion into said aperture, whereby the balance weight may be rocked about said rim and the clip removed from said rim flange.

PAUL F. HATCH.